United States Patent
Nepomniachtchi et al.

(10) Patent No.: US 9,292,737 B2
(45) Date of Patent: Mar. 22, 2016

(54) SYSTEMS AND METHODS FOR CLASSIFYING PAYMENT DOCUMENTS DURING MOBILE IMAGE PROCESSING

(71) Applicant: Mitek Systems, San Diego, CA (US)

(72) Inventors: Grigori Nepomniachtchi, San Diego, CA (US); Vitali Kliatskine, San Diego, CA (US); Nikolay Kotovich, San Diego, CA (US)

(73) Assignee: MITEK SYSTEMS, INC., San Diego, CA (US)

( * ) Notice: Subject to any disclaimer, the term of this patent is extended or adjusted under 35 U.S.C. 154(b) by 0 days.

(21) Appl. No.: 13/844,748

(22) Filed: Mar. 15, 2013

(65) Prior Publication Data

US 2013/0287284 A1     Oct. 31, 2013

Related U.S. Application Data

(63) Continuation-in-part of application No. 12/778,943, filed on May 12, 2010, which is a continuation-in-part of application No. 12/717,080, filed on Mar. 3, 2010, now Pat. No. 7,778,457, and a continuation-in-part of application No. 12/346,071, filed on Dec. 30, 2008, now Pat. No. 7,953,268, and a continuation-in-part of application No. 12/346,091, filed on Dec. 30, 2008, now Pat. No. 7,949,176.

(60) Provisional application No. 61/022,279, filed on Jan. 18, 2008.

(51) Int. Cl.
| | |
|---|---|
| *G06K 9/00* | (2006.01) |
| *G06Q 20/04* | (2012.01) |
| *G06K 9/18* | (2006.01) |
| *G06K 9/20* | (2006.01) |

(52) U.S. Cl.
CPC ............ *G06K 9/00442* (2013.01); *G06K 9/186* (2013.01); *G06K 9/2063* (2013.01); *G06Q 20/042* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 2002/0037097 A1* | 3/2002 | Hoyos et al. | 382/137 |
| 2002/0085745 A1* | 7/2002 | Jones et al. | 382/135 |
| 2003/0099379 A1* | 5/2003 | Monk et al. | 382/115 |
| 2004/0081332 A1* | 4/2004 | Tuttle et al. | 382/100 |
| 2005/0125295 A1* | 6/2005 | Tidwell et al. | 705/16 |
| 2005/0163362 A1* | 7/2005 | Jones et al. | 382/137 |
| 2005/0229010 A1* | 10/2005 | Monk et al. | 713/186 |
| 2007/0110277 A1* | 5/2007 | Hayduchok et al. | 382/101 |

(Continued)

*Primary Examiner* — Sean Motsinger
(74) *Attorney, Agent, or Firm* — Procopio, Cory, Hargreaves & Savitch LLP; Noel C. Gillespie

(57) ABSTRACT

Systems and methods are provided for processing an image of a financial payment document captured using a mobile device and classifying the type of payment document in order to extract the content therein. These methods may be implemented on a mobile device or a central server, and can be used to identify content on the payment document and determine whether the payment document is ready to be processed by a business or financial institution. The system can identify the type of payment document by identifying features on the payment document and performing a series of steps to determine probabilities that the payment document belongs to a specific document type. The identification steps are arranged starting with the fastest step in order to attempt to quickly determine the payment document type without requiring lengthy, extensive analysis.

19 Claims, 10 Drawing Sheets

(56) References Cited

U.S. PATENT DOCUMENTS

| | | | |
|---|---|---|---|
| 2007/0114785 A1* | 5/2007 | Porter | 283/58 |
| 2010/0038839 A1* | 2/2010 | DeWitt et al. | 270/52.01 |
| 2010/0254604 A1* | 10/2010 | Prabhakara et al. | 382/173 |
| 2012/0201416 A1* | 8/2012 | DeWitt et al. | 382/101 |
| 2012/0230577 A1* | 9/2012 | Calman et al. | 382/138 |
| 2014/0037183 A1* | 2/2014 | Gorski et al. | 382/138 |
| 2014/0108456 A1* | 4/2014 | Ramachandrula et al. | 707/779 |

* cited by examiner

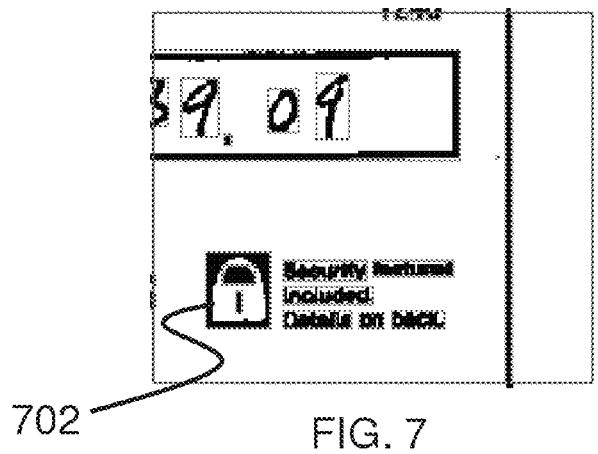
702    FIG. 7
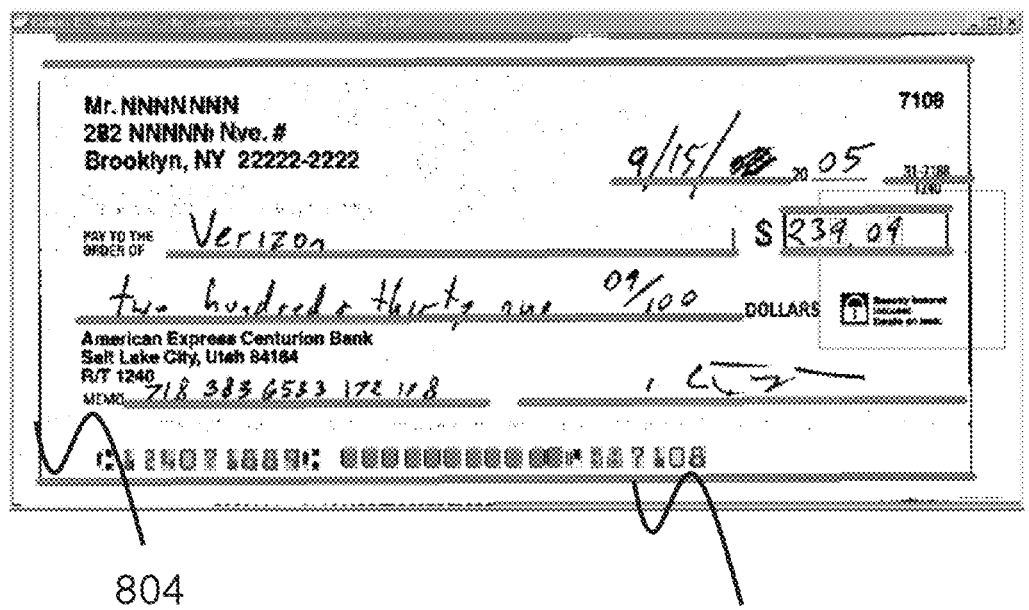
804    FIG. 8    802

SYSTEMS AND METHODS FOR CLASSIFYING PAYMENT DOCUMENTS DURING MOBILE IMAGE PROCESSING

RELATED APPLICATIONS

This application is a continuation-in-part of U.S. patent application Ser. No. 12/778,943, filed on filed May 12, 2010, which claims priority to U.S. patent application Ser. No. 12/717,080, filed on Mar. 3, 2010; U.S. patent application Ser. No. 12/346,071, filed on Dec. 30, 2008; and U.S. patent application Ser. No. 12/346,091, filed on Dec. 30, 2008, both of which claim priority to U.S. Provisional Application No. 61/022,279, filed Jan. 18, 2008; and all of which are hereby incorporated by reference in their entirety.

BACKGROUND

1. Technical Field

The embodiments described herein relate to processing images of documents captured using a mobile device, and more particularly to real-time processing and feature extraction of images of payment documents for classifying the payment document therein.

2. Related Art

Financial institutions and other businesses have become increasingly interested in electronic processing of checks and other financial documents in order to expedite processing of these documents. Some techniques allow users to scan a copy of the document using a scanner or copier to create an electronic copy of the document that can be digitally processed to extract content. This provides added convenience over the use of a hardcopy original, which would otherwise need to be physically sent or presented to the recipient for processing. For example, some banks can process digital images of checks and extract check information from the image needed to process the check for payment and deposit without requiring that the physical check be routed throughout the bank for processing. However, the type of information and the accuracy of information which can be processed from an image of a check are limited. As a result, some checks cannot be processed and are rejected during the mobile deposit process. Furthermore, the types of documents which can be processed are often limited to checks, as other financial documents have varying formats and sizes which are too difficult to process electronically.

Mobile devices that incorporate cameras have also become ubiquitous and may also be useful to capture images of financial documents for mobile processing of financial information. The mobile device may be connected with a financial institution or business through a mobile network connection. However, the process of capturing and uploading images of financial documents is often prone to error and produces images of poor quality which cannot be used to extract data. The user is often unaware of whether the captured document image is sufficient and ready for processing by a business or financial institution. Additionally, the variety of formats, sizes and content found on different types of financial documents makes capturing a quality image and accurately extracting content a difficult process.

Therefore, there is a need for identifying a document type from a digital image of a document captured by a mobile device and accurately extracting content from the document.

SUMMARY

Systems and methods are provided for processing an image of a financial payment document captured using a mobile device and classifying the type of document in order to extract the content therein. These methods may be implemented on a mobile device or a central server, and can be used to identify content on the payment document and determine whether the payment document is ready to be processed by a business or financial institution. The system can identify the type of payment document by identifying features on the payment document and performing a series of steps to determine probabilities that the payment document belongs to a specific document type. The identification steps are arranged starting with the fastest step in order to attempt to quickly determine the payment document type without requiring lengthy, extensive analysis.

The payment document may be classified as a check, it may be classified as a personal check, business check, traveler's check, cashier's check, rebate check, etc, based on features identified on the image and compared using databases which store payment type information. Once the type of payment document is determined, known information about the type of payment document is utilized to determine whether the content on the payment document is sufficient for processing of the payment (such as depositing the check) or whether any risk or indications of fraud associated with a particular type of payment document require further processing. Customized rules can be created by a business or financial institution to provide specific actions depending on the type of payment document which is being deposited. Additional portions of the payment document, including a signature line, addressee field, etc. can be checked to ensure that the check is ready to be deposited by the bank.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIG. 7 is an image of a portion of a check depicting the identification of connected components on the payment document, according to one embodiment;

FIG. 8 is an image of a check where an image processing step has identified horizontal and vertical lines, according to one embodiment of the invention;

DETAILED DESCRIPTION

Figure 1:
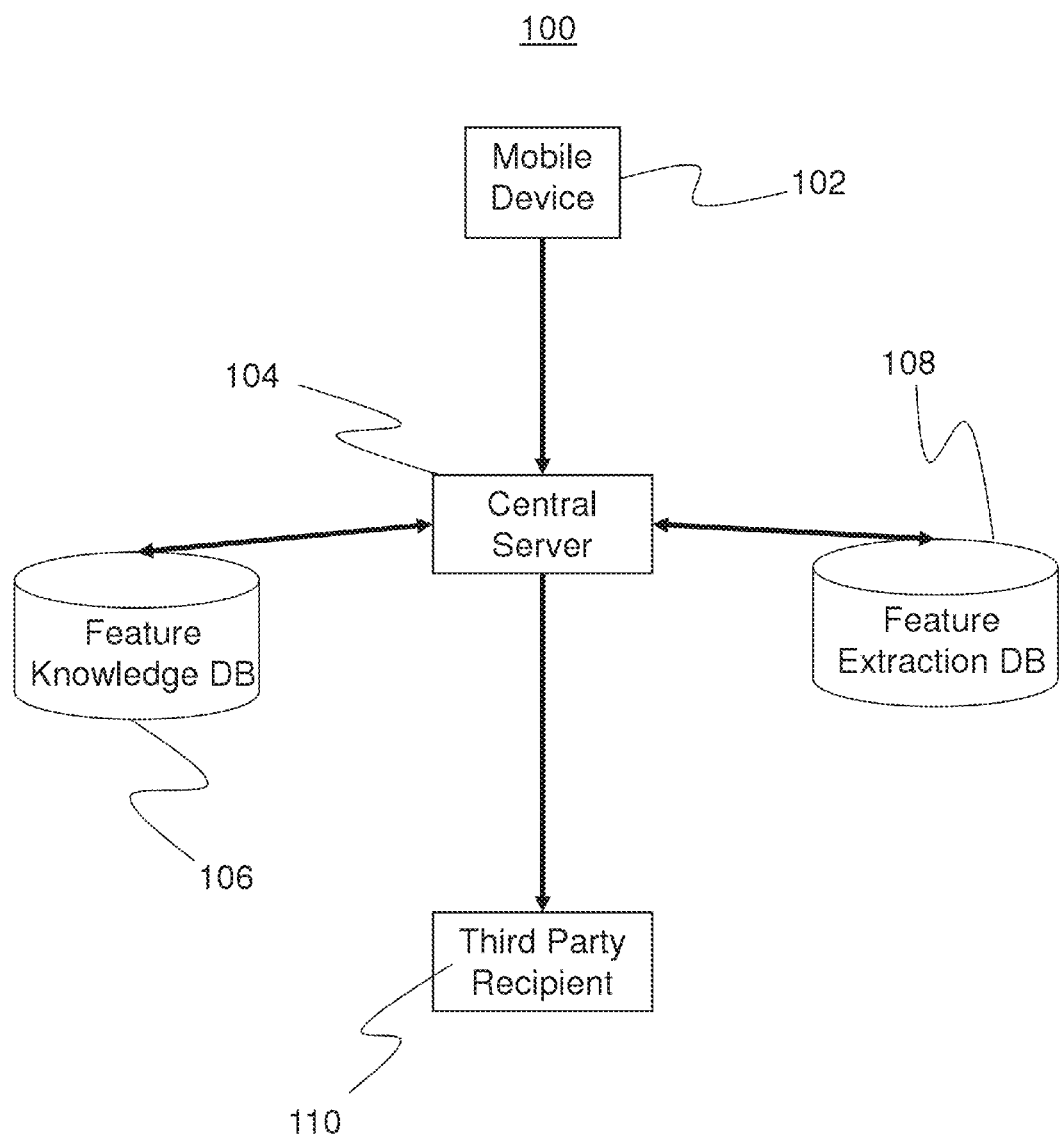
FIG. 1 is a block diagram of a system for classifying a payment document, according to one exemplary embodiment.

The following detailed description is directed to certain specific embodiments. However, it will be understood that these embodiments are by way of example only and should not be seen as limiting the systems and methods described herein to the specific embodiments, architectures, etc. In this description, reference is made to the drawings wherein like parts are designated with like numerals throughout.

Systems and methods are provided for processing an image of a financial payment document captured using a mobile device and classifying the type of payment document in order to extract the content therein. By correcting aspects of the image and extracting relevant features, the type of payment document can be identified, which then provides for faster and more accurate content extraction. An image of a payment document captured by a mobile device is first processed to improve the quality of the image and increase the ability to extract content from the image. Various features are then extracted from the image, and these features are analyzed using a probabilistic approach with a hierarchical classification algorithm to quickly and accurately classify the payment document in the fewest number of steps. Existing information about types of payment documents is utilized to determine if the features and characteristics indicate a particular payment document classification. Additionally, geometric characteristics of the payment document or keyword identification based on an optical character recognition (OCR) step may be used to classify the payment document.

In one embodiment, the payment document is a type of check, wherein the check is classified as a personal check, business check, traveler's check, cashier's check, rebate check, money order, gift certificate, IRS refund check. By classifying the type of check, stored information about particular check types can be used to more accurately capture the content of the check and verify the accuracy of the information on the check. The identified check type may also tell a third party recipient of the check, such as a bank or business, whether the payment document is authentic or fraudulent and whether further processing of the payment document is needed before it can be accepted for payment. Types of checks may be more generally sorted into categories that may be customized by the recipient, such as a group of "regular" check types which are known to be authentic or a group of "irregular checks" that are known to be fraudulent or which are difficult to process to accurately extract their content. In one embodiment, the system may determine that the payment document is simply not a check at all if the features, geometric characteristics and keywords do not provide any indications that the document is a payment document.

These systems and methods may be implemented on a mobile device or at a central server, and either can access stored information about different payment documents and their formats from databases connected with the mobile device or central service over a network. Users are also able to customize the functionality of the classification algorithm to determine the thresholds for various feature matching steps, but also to set customized classifiers which may group certain sets of payment documents into one group and the rest in another based on the user's preferences or experiences in handling checks.

Once the payment document has been classified, content can be extracted based on customized payment document information about where certain fields are located on the form and the expected values of some of those fields. The content of the payment document is more quickly and accurately captured, allowing third parties who need to process the payment document—such as a bank receiving the check for a mobile deposit process—to have greater confidence in the ability to extract the correct information.

I. System Overview

FIG. 1 illustrates one embodiment of a system 100 for processing an image of a payment document captured by a mobile device and classifying the payment document. The system 100 includes a mobile device 102, such as a cellular phone, smartphone, tablet, personal digital assistant (PDA) or other portable electronic device that may be connected with a communications network. The mobile device 102 may include an image capture device (not shown), such as a digital camera or a portable scanning device, that uses an image sensor to capture an image of a document. The mobile device 102 is connected with a central server 104 over a network so that the mobile device 102 can transmit captured images, content or other data to the central server 104. In one embodiment, the central server 104 may send information to the mobile device 102 (and specifically an application running on the mobile device) regarding the payment document types, features and other information needed for the mobile device to classify the payment document and extract content from the payment document. The mobile device 102 or the central server 104 may perform additional image processing and data extraction, as will be described in further detail below, in order to determine information about the document and identify the appropriate content. In one embodiment, the central server 104 may be connected with a feature knowledge database 106 which stores information about different payment document types and the features of each type of payment document. The central server 104 may also be connected with a feature extraction database 108 which stores information obtained from the images captured by the mobile device, such as the features, payment document classifications and content. The payment document type, content of the document and other extracted information may then be transmitted to a third party recipient 110, such as a bank or business which is attempting to process the payment indicated on the payment document.

Figure 2:
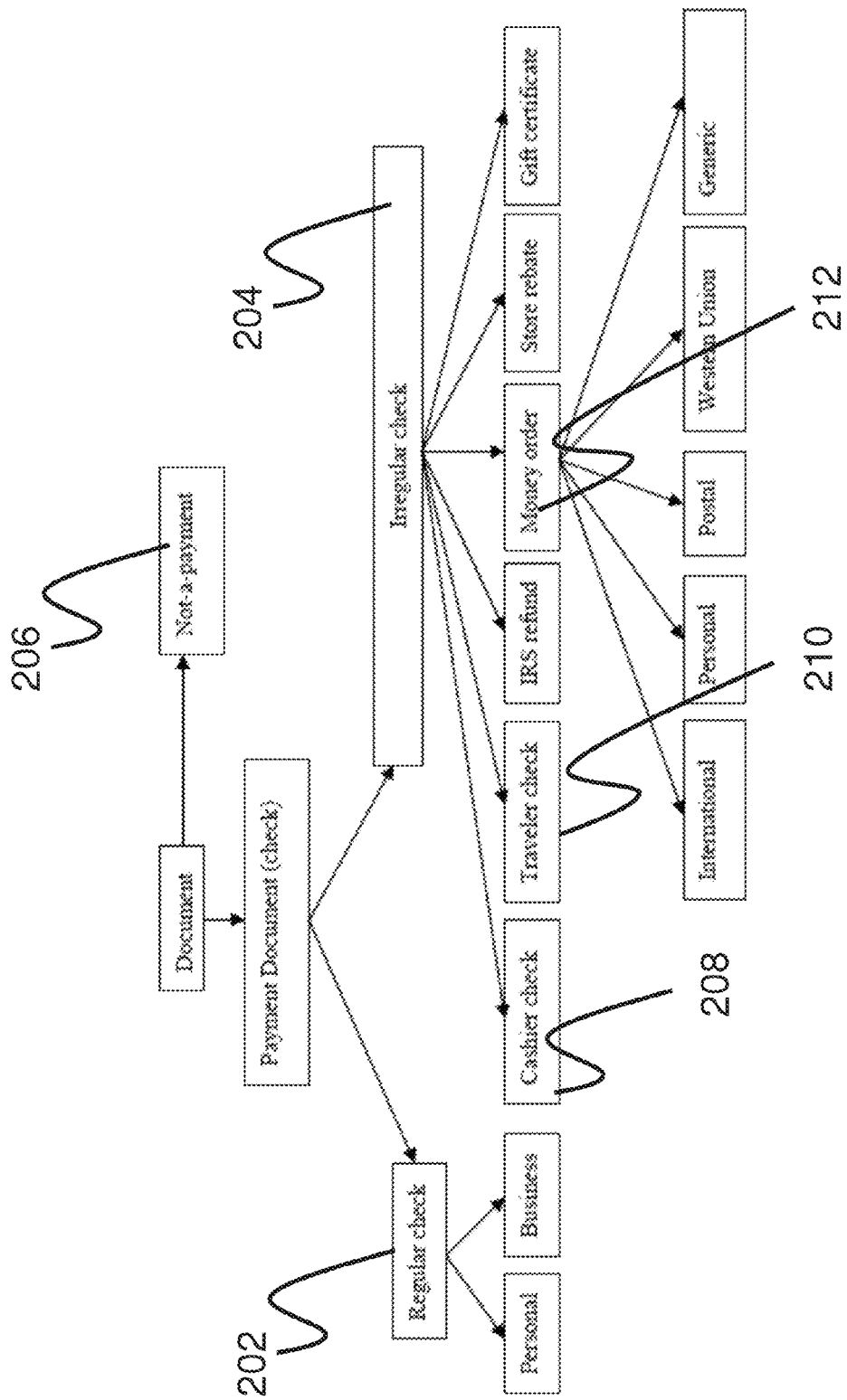
FIG. 2 is a flow diagram of a method of classifying the payment document, according to one exemplary embodiment.

FIG. 2 illustrates a high level flow diagram of a method of classifying the payment document, which depicts how the payment document types may be grouped into overall categories of "regular checks" 202 "irregular checks" 204 or "not-a-payment" 206 documents. A determination is first made as to whether the document is a payment document, after which a document which has been identified as a payment document is classified as either a regular check 202 or an irregular check 204. In one embodiment, personal and business check types comprise the so called "regular" check category, whereas the rest of payment types comprise the so called "irregular" check category. The irregular check categories can be further categorized into specific types or irregular checks, such as cashier's checks 208 or traveler's checks 210. In some instances, even the specific type of irregular checks may have multiple sub-types, as illustrated with the money order 212 in FIG. 2. As will be described further below, these categories may be customized by each user depending on the application and need for identifying certain types of payment documents.

II. Features of Payment Documents

In one embodiment, the system uses prior knowledge about each of the payment document types and includes this into a payment document model stored in the feature knowledge database 106. Each payment document type is characterized according to known information about: 1) the presence of certain image features (such as barcodes, code-lines, check numbers, "lock" icons etc); 2) the values of some geometric characteristic of the payment document (such as width, height, aspect ratio etc); 3) the presence of certain keywords (such as "Money Order," "Pay to the order of" or "Cashier's Check"); and 4) cross-validation between certain features which have the same values (such as a check number in an upper right corner and the check number included in a MICR line), etc.

III. Probabilistic Feature Identification

Each feature is described in probabilistic terms, as in the probability that the payment document is a certain type of payment document based on the presence of a certain feature. For example, a "lock" icon (see FIG. 7) has a certain probability (x) of occurrence in personal checks, a second probability (y) of occurrence in a money order, etc. The probability value required to make a definitive determination of a payment document type may vary depending on the particular feature in question, or may be based on a combined probability of several features.

The probabilistic approach helps to build a payment classifier which is both fast and robust to the many distortions that occur in mobile images.

IV. Hierarchical Identification

Figure 3:
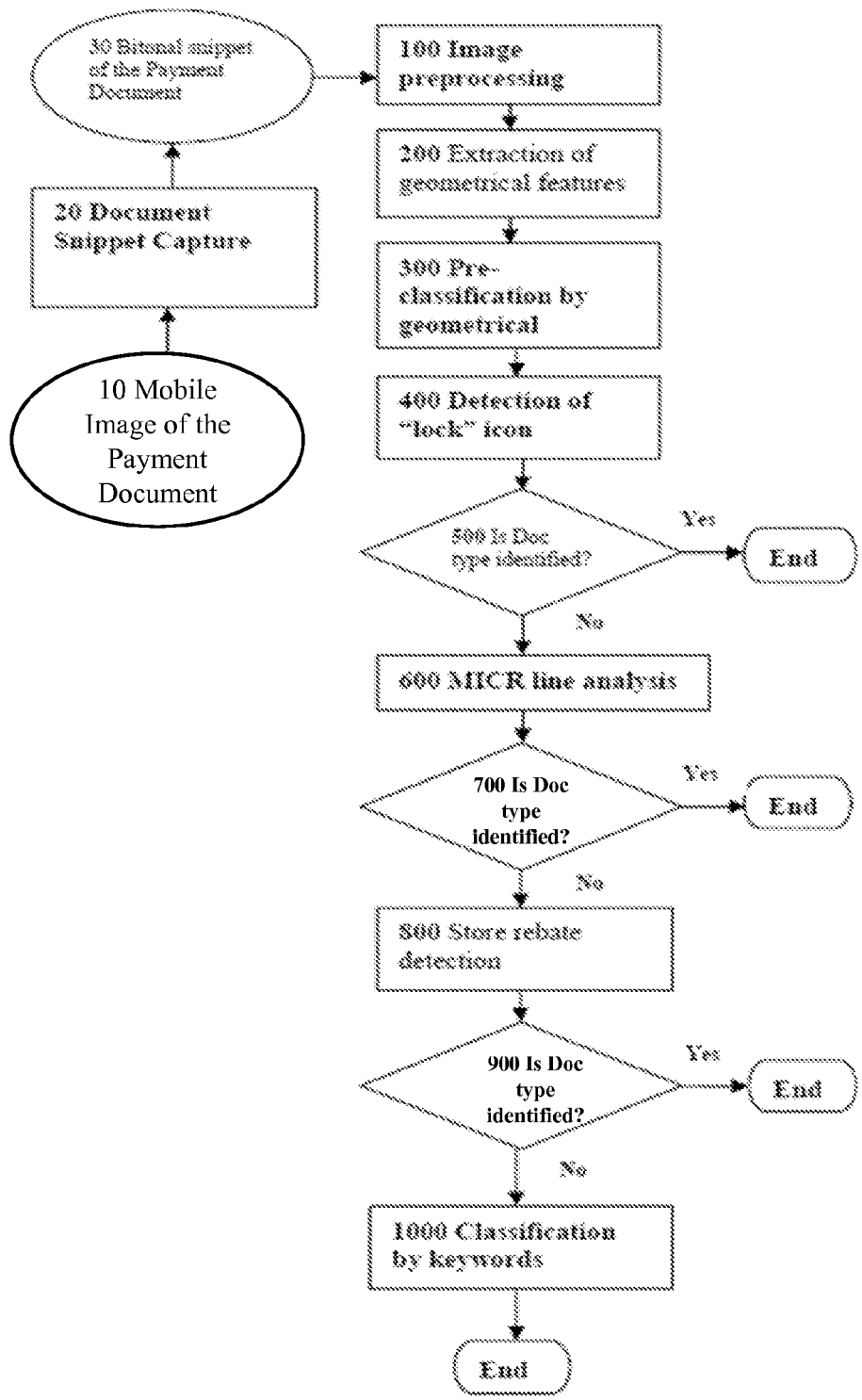
FIG. 3 is a flow diagram of a decision tree for processing an image of a payment document and classifying the payment document, according to one exemplary embodiment.

The system uses document identification logic based on a hierarchical classification algorithm, according to the flowchart in FIG. 3, to perform a specifically-designed series of steps that will determine the payment document type as quickly and accurately as possible. The decision tree starts with easy-to-compute features and tries to make a final, definitive classification as early in the process as possible in order to avoid more time-consuming computation steps later on.

In order to finish the classification process, the system uses known probabilistic distributions of features within the payment document types and between the payment document types. At each decision point (see steps 500, 700 and 900 in FIG. 3), the system matches the features it identified against the feature knowledge database and estimates if the probability of identification is high enough to finish the process. If the probability of the payment document in the mobile-captured images exceeds a certain threshold at one of these decision points, the classification process stops. However, if the final decision of the payment document type cannot be determined at an earlier decision point, the system moves along the decision tree in FIG. 3 towards more time-consuming steps.

As illustrated in FIG. 3, the method may include a first step 10 of receiving a mobile image of the payment document. The mobile image of the payment document may remain on the mobile device for processing at the mobile device itself, or it may be passed on to the central server for processing. In step 20, one or more image processing steps may be performed on the mobile image in order to improve the quality of the image and correct one or more problems with the image caused by the limitations of mobile image capture. In one embodiment, the image processing steps may be those described in U.S. Pat. No. 8,000,514, entitled "Methods for Mobile Image Capture and Processing of Checks," the content of which is incorporated herein in its entirety. The image processing may also crop the image to display only the portion of the image which includes the payment document. A third step 30 of creating a bitonal image of the cropped and corrected image may then be carried out in order to improve the readability of the payment document by a content recognition process such as OCR.

The cropped, corrected and binarized image may then be provided for the hierarchical classification steps, as will be described in detail immediately below.

Image Preprocessing

Figure 4:
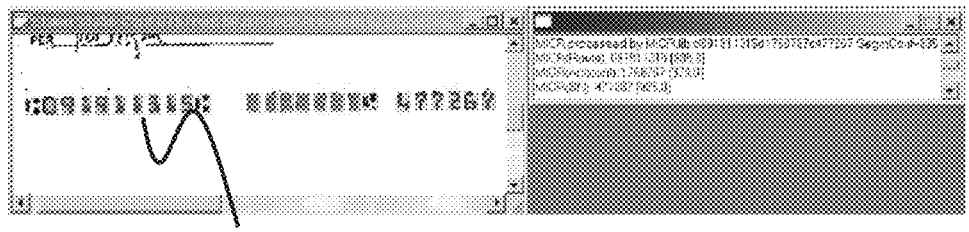
FIG. 4 is an image of a MICR line which is detected in the process of classifying the payment document, according to one embodiment of the invention.
Figure 5:
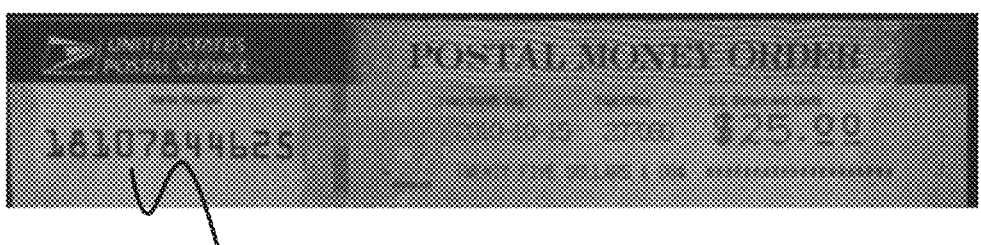
FIG. 5 is an image of a money order with an OCRA codeline that can be detected for classifying the payment document, according to one embodiment of the invention.
Figure 6:
FIG. 6 is an image of a rebate check with a barcode which can be detected, parsed and read for classifying the payment document, according to one embodiment of the invention.
Figure 9:
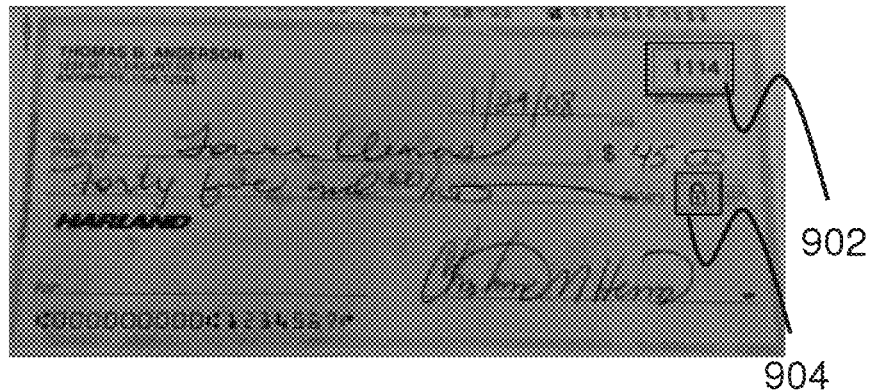
FIG. 9 is an image of a check where a check number and a lock icon have been identified on the check, according to one embodiment of the invention.
Figure 10:
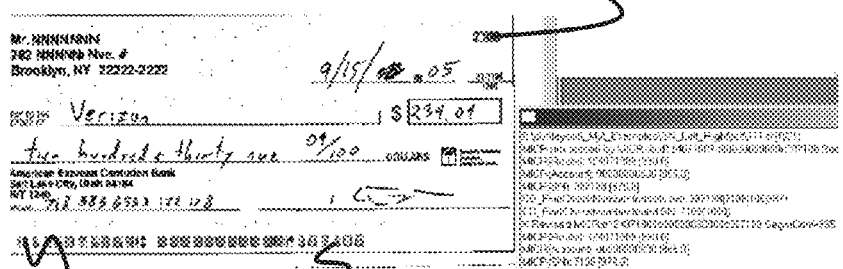
FIG. 10 is an image of a check where a cross-validation process is carried out to match the check number in one location of the check with the check number located in the MICR line, according to one embodiment of the invention.

The hierarchical classification begins with an image pre-processing step 100. In this step, the image is processed in order to extract all features needed to classify the payment document type. Examples of features that may be identified are listed below, although one of skill in the art will appreciate that other features may be identified and used to determine payment document types. Image pre-processing may include the following operations:

1. Finding and reading of a magnetic ink character recognition ("MICR") line 402, as illustrated in FIG. 4.
2. Finding and reading of an optical character recognition type A ("OCR-A") codeline 502, as illustrated in FIG. 5.
3. Finding one or more barcodes 602, as illustrated in FIG. 6.
4. Finding one or more image elements, such as connected components 702 (FIG. 7), horizontal lines 802 and vertical lines 804 (FIG. 8), a check number 902 in a top-right quadrant of the image 900 (FIG. 9) and a "lock" icon 904 in a middle-right side of the image 900. A connected component (CC) is a group of mutually adjacent (connected) pixels on the image which is separated from the rest of the image. Usually, each character is represented by one CC (except for 'I' and 'j' which may have 2 CCs). If a character is broken due to imaging deficiencies, it's represented by 2 or more CCs.
5. Performing a cross-validation and possible correction of the check number 1002 extracted from the MICR-line 1004 against the check number 1006 found in the upper right corner of image 1000, as illustrated in FIG. 10. This information is used in decision making steps described further herein.

Extracting Geometric Features

In step 200, geometric image characteristics of the payment document may be determined, such as a width, height and aspect ratio. This step also provides the ability to estimate possible positions of the "lock" icon 904 and barcode line 602 by grouping found connected components. The system uses the size, alignment and adjacency characteristics to detect the "lock" icon and barcode. For example, a barcode contains at least N connected components, which are closer than Y pixels to each other and have height-to-width ration of at least Z.

Pre-Classification Using Geometric Features

In step 300, the geometrical features identified in step 200 are analyzed in order to narrow down the subset of possible document types. This step filters and eliminates inapplicable document types using geometrical characteristics of the given image. For instance, business checks are wider than personal checks; personal checks differ from most irregular check types by aspect ratio, etc.

Lock Icon Detection—First Decision Point

In step 400, the system looks for the "lock" icon 904 on the image in the areas where it is typically found on a personal check, cashier's check and money order. The results of the geometric feature extraction 200 helps identify the possible search areas for the lock icon 904. The "lock" detection is based on a technique designed for "lock" classification. The lock detection technique is a symbol recognition technique similar to the one used to recognize MICR-characters. It is based on a comparison of connected components (potential location of "lock") against several hundred template images (from a training data base). The result of the lock icon detection 400 includes a set of found alternative lock positions within the image. These positions can then be compared with the known positions of the lock icon in different payment document types to hopefully determine the payment document type at this stage in the process.

At step 500, if the "lock" icon has been found in step 400 above and its position has been matched with a payment document type or types, the identification process is completed. Otherwise, further analysis is needed. In one embodiment, a standard Bayesian model is used for developing the probabilistic approach.

MICR Line Analysis—Second Decision Point

Figure 11:
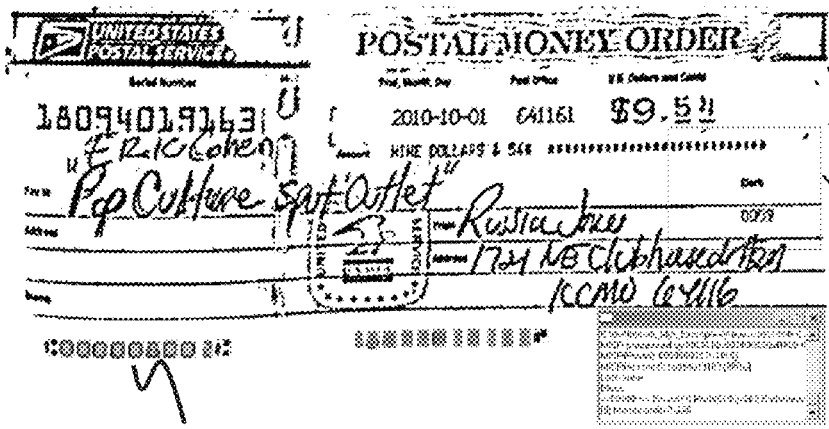
FIG. 11 is an image of a money order where the MICR line is parsed and analyzed in order to classify the type of check, according to one exemplary embodiment.

In step 600, if the document was not identified by the lock icon detection decision point 500, the process tries to complete identification by finding unique values and/or positions of the MICR line components 1102 that may be present in each document type, as illustrated in FIG. 11. The MICR-line analysis attempts to reduce a number of hypotheses for the payment document type. Each document type has its own type-specific MICR properties, presence or lack of which is used in this step. For example, more than 99% of personal checks will have the check number in the MICR line, whereas other types of payment are much less likely to have it. This information is built into the probabilistic model which is used at every decision-making step In step 700, if the MICR line analysis provides a sufficient probability that the payment document is a specific type, the classification process is complete. If not, more detailed analysis is needed.

Store Rebate Detection—Third Decision Point

Figure 12:
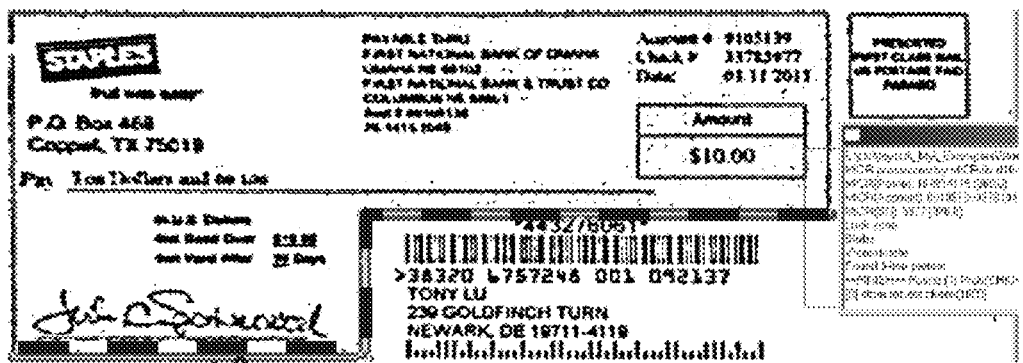
FIG. 12 is an image of a rebate form which is identified by finding linear patterns on the document, according to one exemplary embodiment.
Figure 13:
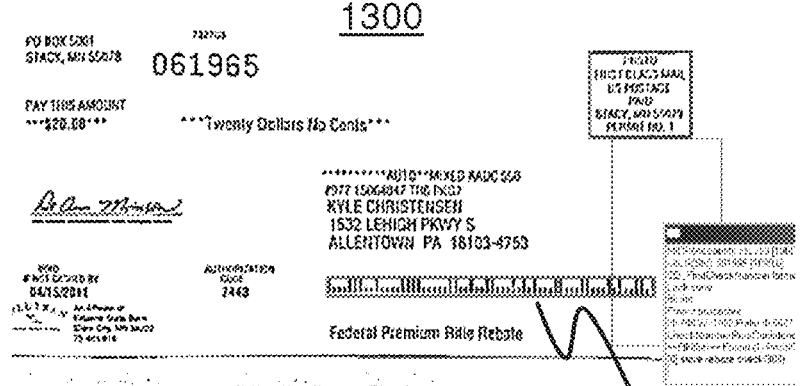
FIG. 13 is an image of a rebate form which is identified by finding a one-dimensional barcode on the document, according to one exemplary embodiment.

In step 800, the payment document is analyzed to find specific linear patterns 1202 indicated by the dashed line along a bottom edge of the rebate check 1200 in FIG. 12, or unique one-dimensional bar codes 1302 in FIG. 13 which are known to occur in a store rebate check 1300.

In step 900, if one or more of the aforementioned patterns were found and geometrical features confirm the patterns, the classification process is complete. If not, more detailed analysis is needed.

Keyword Classification

Figure 14A:
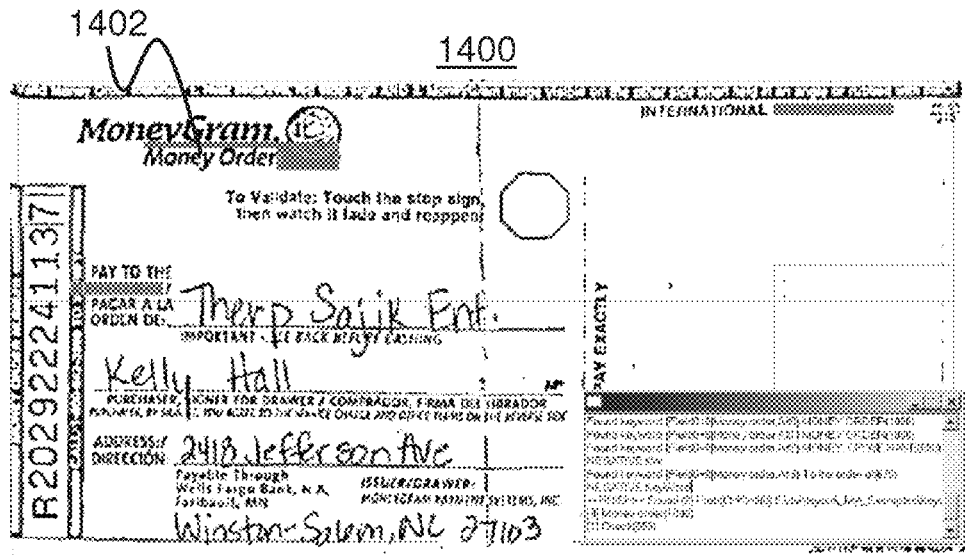
FIG. 14A is an image of a money order which is identified by finding a keyword on the payment document, according to one embodiment of the invention.
Figure 14B:
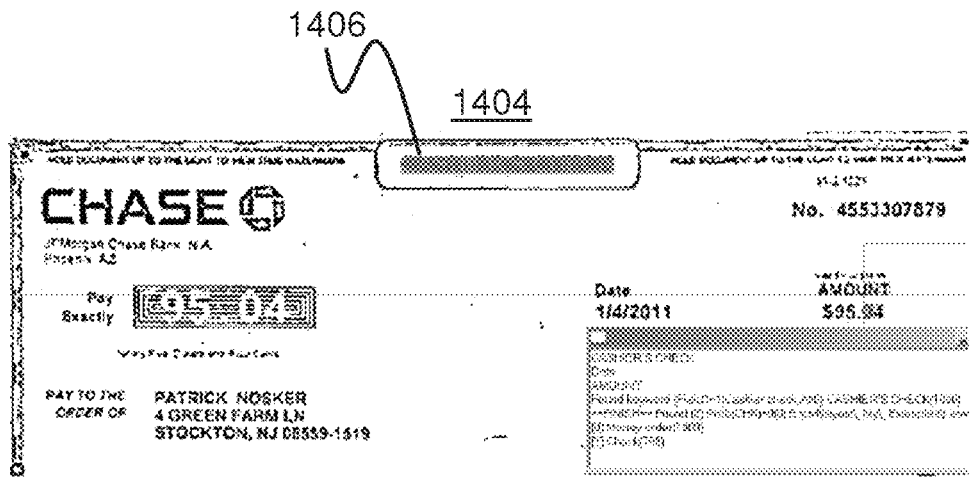
FIG. 14B is an image of a cashier's check which is identified by finding a keyword on the payment document, according to one embodiment of the invention.

If none of the above steps have been able to classify the payment document, keyword classification is performed in step 1000 by performing optical character recognition (OCR) on the payment document and analyzing words and phrases to determine a payment document type. This is the slowest classification step since it uses OCR, which is why it is performed only at the end of the classification process and only if other classification steps have failed. Keyword classification looks for predefined keywords that are known to appear on different payment document types, such as the word "money order" 1402 on the money order 1400 in FIG. 14A, or the word "cashier's check" 1406 on the cashier's check 1408 in FIG. 14B. Other phrases such as "pay to the order of" may be used simply to determine if the payment document is a payment document or a non-payment document. If one of preconfigured keywords was found, the payment document is classified according to the corresponding document type, and the classification process stops.

If the keyword classification step 1000 fails to identify the document, the classification algorithm outputs a full set of hypotheses for each of the decision points listed above which correspond to the previous classification stages. The output of the hypotheses may provide insight into the type of payment document based on the determined probabilities in relation to each other.

V. User-Specific Configurations

The classification algorithm is adjustable and flexible enough to match a user's preferences, such as which document types should be distinguished and which should be placed to the same terminal category, according to the document models above. For instance, the user can configure the algorithm to classify an IRS refund check as a "Regular Check," or configure it to ignore differences between Cashier's Checks and Traveler's Checks by placing them into the same output category.

In one embodiment, differentiating between types of checks provides additional information to a bank being asked to deposit the check as to the potential risk of the check being fraudulent. The risk of fraudulent checks varies depending on the type of check, and so a bank can set up customized rules for each type of check that it may receive during a mobile deposit process. If the check type is one that is commonly associated with fraud, the bank may immediately deny the request, or request additional processing of the check image before deciding whether to deposit the check. The user is sent a message if the deposit is denied, and may be provided with instructions to manually deposit the check so that the bank can review the original check.

VI. Computer-Implemented Embodiment

Figure 15:
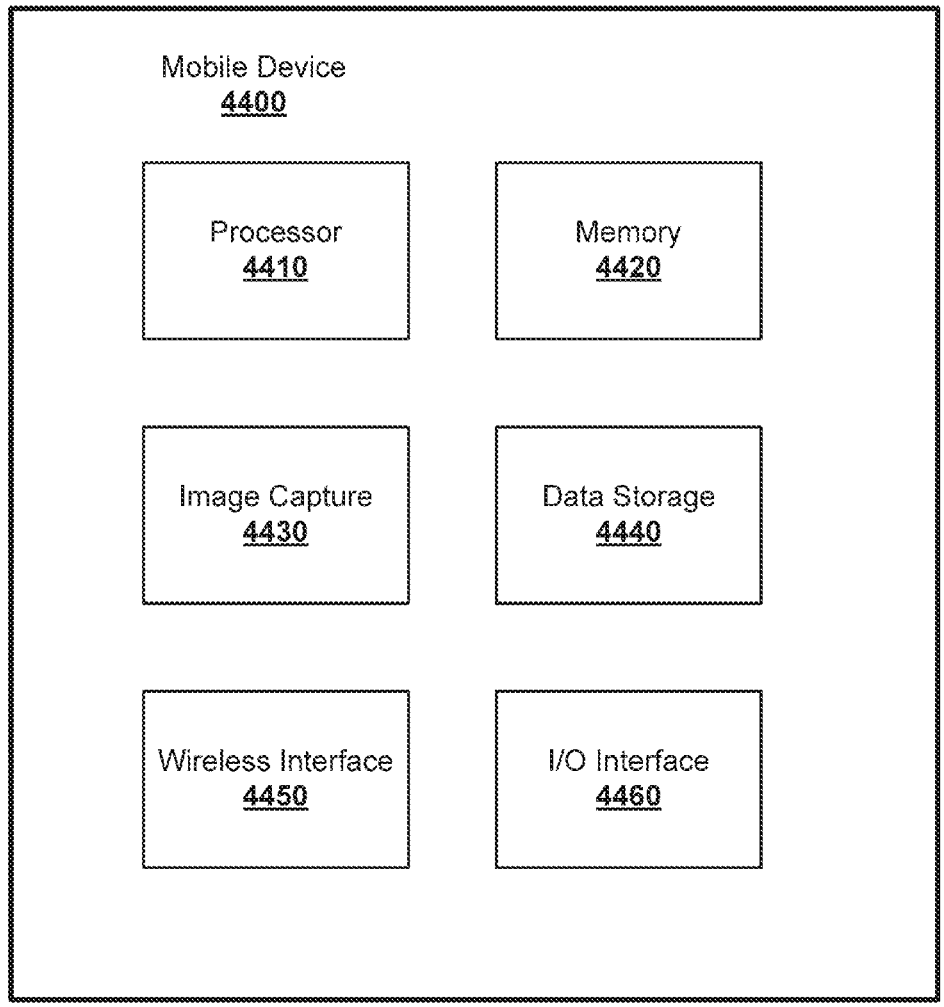
FIG. 15 is a block diagram of various functional elements of a mobile device that can be used with the various systems and methods described herein, according to one embodiment.

FIG. 15 is an exemplary embodiment of a mobile device 4400 according to an embodiment. Mobile device 4400 can be used to implement the mobile device 102 of FIG. 1. Mobile device 4200 includes a processor 4410. The processor 4410 can be a microprocessor or the like that is configurable to execute program instructions stored in the memory 4420 and/or the data storage 4440. The memory 4420 is a computer-readable memory that can be used to store data and or computer program instructions that can be executed by the processor 4410. According to an embodiment, the memory 4420 can comprise volatile memory, such as RAM and/or persistent memory, such as flash memory. The data storage 4440 is a computer readable storage medium that can be used to store data and or computer program instructions. The data storage 4440 can be a hard drive, flash memory, a SD card, and/or other types of data storage.

The mobile device 4400 also includes an image capture component 4430, such as a digital camera. According to some embodiments, the mobile device 4400 is a mobile phone, a smart phone, or a PDA, and the image capture component 4430 is an integrated digital camera that can include various features, such as auto-focus and/or optical and/or digital zoom. In an embodiment, the image capture component 4430 can capture image data and store the data in memory 4220 and/or data storage 4440 of the mobile device 4400.

Wireless interface 4450 of the mobile device can be used to send and/or receive data across a wireless network. For example, the wireless network can be a wireless LAN, a mobile phone carrier's network, and/or other types of wireless network.

I/O interface 4460 can also be included in the mobile device to allow the mobile device to exchange data with peripherals such as a personal computer system. For example, the mobile device might include a USB interface that allows the mobile to be connected to USB port of a personal computer system in order to transfers information such as contact information to and from the mobile device and/or to transfer image data captured by the image capture component 4430 to the personal computer system.

As used herein, the term unit might describe a given unit of functionality that can be performed in accordance with one or more embodiments of the present invention. As used herein, a unit might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of processes used in conjunction with the operations described herein are implemented in whole or in part using software, in one embodiment, these software elements can be implemented to operate with a computing or processing module capable of carrying out the functionality described with respect thereto. One such example-computing module is shown in FIG. 16, which illustrates a computer system that can be used to implement mobile image payment document classification system, according to an embodiment.

Various embodiments are described in terms of this example-computing module 1900. After reading this description, it will become apparent to a person skilled in the relevant art how to implement the invention using other computing modules or architectures.

Figure 16:
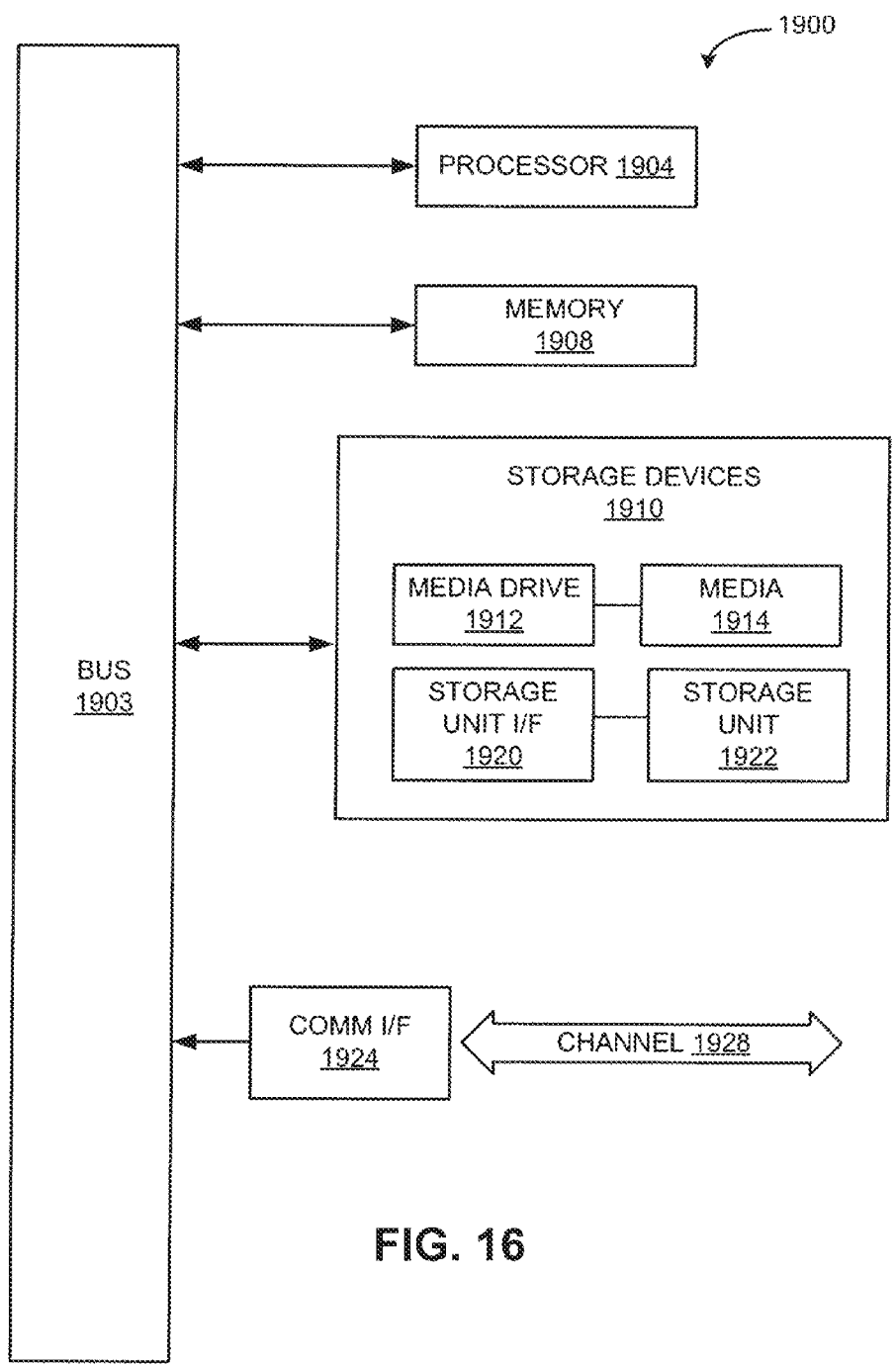
FIG. 16 is a block diagram of functional elements of a computer system that can be used to implement the mobile device and/or the servers described in the systems and methods disclosed herein.

Referring now to FIG. 16, computing module 1900 may represent, for example, computing or processing capabilities found within desktop, laptop and notebook computers; mainframes, supercomputers, workstations or servers; or any other type of special-purpose or general-purpose computing devices as may be desirable or appropriate for a given application or environment. Computing module 1900 might also represent computing capabilities embedded within or otherwise available to a given device. For example, a computing module might be found in other electronic devices. Computing module 1900 might include, for example, one or more processors or processing devices, such as a processor 1904. Processor 1904 might be implemented using a general-purpose or special-purpose processing engine such as, for example, a microprocessor, controller, or other control logic.

Computing module 1900 might also include one or more memory modules, referred to as main memory 1908. For example, random access memory (RAM) or other dynamic memory might be used for storing information and instructions to be executed by processor 1904. Main memory 1908 might also be used for storing temporary variables or other intermediate information during execution of instructions by processor 1904. Computing module 1900 might likewise include a read only memory ("ROM") or other static storage device coupled to bus 1902 for storing static information and instructions for processor 1904.

The computing module 1900 might also include one or more various forms of information storage mechanism 1910, which might include, for example, a media drive 1912 and a storage unit interface 1920. The media drive 1912 might include a drive or other mechanism to support fixed or removable storage media 1914. For example, a hard disk drive, a floppy disk drive, a magnetic tape drive, an optical disk drive, a CD or DVD drive (R or RW), or other removable or fixed media drive. Accordingly, storage media 1914 might include, for example, a hard disk, a floppy disk, magnetic tape, cartridge, optical disk, a CD or DVD, or other fixed or removable medium that is read by, written to or accessed by media drive 1912. As these examples illustrate, the storage media 1914 can include a computer usable storage medium having stored therein particular computer software or data.

In alternative embodiments, information storage mechanism 1910 might include other similar instrumentalities for allowing computer programs or other instructions or data to be loaded into computing module 1900. Such instrumentalities might include, for example, a fixed or removable storage unit 1922 and an interface 1920. Examples of such storage units 1922 and interfaces 1920 can include a program cartridge and cartridge interface, a removable memory (for example, a flash memory or other removable memory module) and memory slot, a PCMCIA slot and card, and other fixed or removable storage units 1922 and interfaces 1920 that allow software and data to be transferred from the storage unit 1922 to computing module 1900.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1924 might typically be carried on signals, which can be electronic, electromagnetic (which includes optical) or other signals capable of being exchanged by a given communications interface 1924. These signals might be provided to communications interface 1924 via a channel 1928. This channel 1928 might carry signals and might be implemented using a wired or wireless communication medium. These signals can deliver the software and data from memory or other storage medium in one computing system to memory or other storage medium in computing system 1900. Some examples of a channel might include a phone line, a cellular link, an RF link, an optical link, a network interface, a local or wide area network, and other wired or wireless communications channels.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMAX, 802.XX or other interface), a communications port (such as for example, a USB port, IR port, RS232 port, Bluetooth interface, or other port), or other communications interface. Software and data transferred via communications interface 1924 might typically be carried on signals, which can be electronic, electromagnetic, optical or other signals capable of being exchanged by a given communications interface 1924. These signals might be provided to communications interface 1924 via a channel 1928. This channel 1928 might carry signals and might be implemented using a wired or wireless medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 1908, storage unit 1920, and media 1914. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1900 to perform features or functions of the present invention as discussed herein.

While various embodiments of the present invention have been described above, it should be understood that they have been presented by way of example only, and not of limitation. The breadth and scope of the present invention should not be limited by any of the above-described exemplary embodiments. Where this document refers to technologies that would be apparent or known to one of ordinary skill in the art, such technologies encompass those apparent or known to the skilled artisan now or at any time in the future. In addition, the invention is not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the present invention.

Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A payment document classification system, comprising:
   a communication unit which receives an image of a payment document captured by a mobile device;
   a preprocessing unit which extracts at least one feature from the image;
   a comparison unit which compares the at least one extracted feature with at least one known feature of a payment document type to determine a likelihood that the payment document matches the at least one payment document type, wherein the comparison unit is further configured to compare a plurality of extracted features with a plurality of known features in a series, starting with an extracted feature which requires the least computation time of the plurality of extracted features; and
   a classification unit which classified the payment document as at least one payment document type based on the likelihood that the payment document matches the at least one payment document type.

2. The system of claim 1, wherein the at least one extracted feature is a location of a lock icon.

3. The system of claim 2, wherein the comparison unit compares the location of the lock icon with at least one known location of the lock icon on a payment document type, and wherein the classification unit classifies the payment document as at least one payment document type if the location of the lock icon matches the at least one known location.

4. The system of claim 1, wherein the at least one feature includes one or more connected components of the image of the payment document.

5. The system of claim 1, wherein the at least one feature includes one or more horizontal lines and one or more vertical lines.

6. The system of claim 1, wherein the comparison unit compares a plurality of extracted features with a plurality of known features in a sequence until one of the plurality of extracted features matches one of the plurality of known features.

7. The system of claim 1, further comprising a configuration unit where a user can configure a plurality of payment document types into a category of payment document types for classifying the payment document as belonging to the category of payment document types.

8. The system of claim 1, further comprising an image correction unit which receives the image of the payment document from the communication unit and corrects at least one aspect of the image of the payment document to produce a corrected image.

9. A method of classifying a payment document, comprising:
   receiving an image of a payment document captured by a mobile device;
   extracting at least one feature from the image;
   comparing the at least one extracted feature with at least one known feature of a payment document type to determine a likelihood that the payment document matches the at least one payment document type, wherein comparing further includes comparing a plurality of extracted features with a plurality of known features in a series, starting with an extracted feature which requires the least computation time of the plurality of extracted features; and
   classifying the payment document as at least one payment document type based on the likelihood that the payment document matches the at least one payment document type.

10. The method of claim 9, wherein the at least one extracted feature is a location of a lock icon.

11. The method of claim 10, further comprising comparing the location of the lock icon with at least one known location of the lock icon on a payment document type and classifying the payment document as at least one payment document type if the location of the lock icon matches the at least one known location.

12. The method of claim 9, wherein the at least one feature includes one or more connected components of the image of the payment document.

13. The method of claim 9, wherein the at least one feature includes one or more horizontal lines and one or more vertical lines.

14. The method of claim 9, further comprising comparing a plurality of extracted features with a plurality of known features in a sequence until one of the plurality of extracted features matches one of the plurality of known features.

15. The method of claim 9, further comprising configuring a plurality of payment document types into a category of payment document types for classifying the payment document as belonging to the category of payment document types.

16. The method of claim 9, further comprising receiving the image of the payment document from the communication unit and correcting at least one aspect of the image of the payment document to produce a corrected image.

17. A payment document classification system, comprising:

a communication unit which receives an image of a payment document captured by a mobile device;

a preprocessing unit which extracts a plurality of features from the image;

a comparison unit which compares the plurality of extracted features with a plurality of known features of a payment document type in a series until one of the plurality of extracted features matches one of the plurality of known features, wherein the comparison starts with an extracted feature which requires the least computation time of the plurality of extracted features; and a classification unit which classified the payment document as at least one payment document type when at least one extracted feature matches at least one known feature.

18. The payment document classification system of claim 1, wherein the at least one extracted feature is a geometric feature which includes an aspect ratio of the payment document.

19. The method of claim 9, wherein the at least one extracted feature is a geometric feature which includes an aspect ratio of the payment document.

* * * * *